United States Patent
Nonaka et al.

(10) Patent No.: US 6,893,781 B2
(45) Date of Patent: May 17, 2005

(54) COLOR FILTER, LIQUID CRYSTAL DISPLAY DEVICE, AND METHOD FOR MAKING COLOR FILTER

(75) Inventors: Harushi Nonaka, Otsu (JP); Tetsuo Yamashita, Kyoto (JP); Tetsuya Goto, Otsu (JP)

(73) Assignee: Toray Industries, Inc. (JP)

( * ) Notice: Subject to any disclaimer, the term of this patent is extended or adjusted under 35 U.S.C. 154(b) by 2 days.

(21) Appl. No.: 10/327,407

(22) Filed: Dec. 20, 2002

(65) Prior Publication Data

US 2003/0179327 A1 Sep. 25, 2003

(30) Foreign Application Priority Data

Dec. 25, 2001 (JP) ............................ 2001-392207

(51) Int. Cl.⁷ .................. G02B 5/20; G03F 1/1335
(52) U.S. Cl. ............................... 430/7; 349/106
(58) Field of Search .................. 430/7; 349/106

(56) References Cited

U.S. PATENT DOCUMENTS

2002/0003596 A1 * 1/2002 Kim .......................... 349/106

2003/0016321 A1   1/2003 Takizawa

FOREIGN PATENT DOCUMENTS

| JP | 2000047192 | 2/2000 |
| JP | 2001033778 | 9/2001 |
| JP | 2001305524 | 10/2001 |

* cited by examiner

*Primary Examiner*—John A. McPherson
(74) *Attorney, Agent, or Firm*—Piper Rudnick LLP

(57) ABSTRACT

Disclosed is a method for fabricating a color filter for a transflective liquid crystal display device inexpensively in which desired color purities, brightnesses, and color tones are obtained for reflective display and transmissive display. A color filter for a liquid crystal display device includes pixels of a plurality of colors, each pixel of at least one color including a transmissive area and a reflective area. The pixel of at least one color includes a plurality of laminated color layers. The uppermost color layer in the pixel including the plurality of laminated color layers is composed of a photosensitive color resist. In the reflective area of the pixel including the plurality of laminated color layers, a transparent resin layer is disposed between a substrate and the color layer portion.

17 Claims, 8 Drawing Sheets

COLOR FILTER, LIQUID CRYSTAL DISPLAY DEVICE, AND METHOD FOR MAKING COLOR FILTER

BACKGROUND OF THE INVENTION

1. Field of the Invention

The present invention relates to a color filter, a liquid crystal display device including the color filter, a transflective liquid crystal display device which has combined characteristics of transmissive liquid crystal display and reflective liquid crystal display, and a method for making a color filter.

2. Description of the Related Art

At present, liquid crystal display devices are used in various fields, such as for notebook PCs, mobile information terminals, desktop monitors, and digital cameras, because of their characteristics, such as their low weight, thinness, and low power consumption. With respect to liquid crystal display devices using backlights, in order to reduce the power consumption, there have been demands for higher utilization of light from the backlights and also color filters with higher transmittance. Although the transmittance of the color filters is improving year after year, it is not possible to expect a large decrease in power consumption due to an improvement in the transmittance.

Recently, a reflective liquid crystal display device which does not require a backlight light source having high power consumption has been developed, and it has been disclosed that a large reduction in power consumption is obtained, i.e., approximately one-seventh that of a transmissive liquid crystal display device (Nikkei Microdevices Flat Panel Display 1998 Yearbook, p. 126).

Although a reflective liquid crystal display device has the advantages of lower power consumption compared to a transmissive liquid crystal display device and of excellent outdoor visibility, the reflective liquid crystal display device has problems in that the display becomes dark and the visibility strongly deteriorates in places where a sufficient intensity of ambient light is not available. In order to make display visible even in a dark environment, two devices provided with light sources have been disclosed. One is a liquid crystal display device in which a backlight is provided as a light source and the reflection layer in each pixel has a cutout so that the device partially works in the transmissive display mode and partially works in the reflective display mode, i.e., a so-called transflective liquid crystal display device (disclosed, for example, in Fine Process Technology Japan '99, Professional Technology Seminar Paper A5), and the other is a reflective liquid crystal display device provided with a front light.

In a transflective liquid crystal display device provided with a backlight, since a transmissive area using light from the backlight and a reflective area using ambient light coexist in one pixel, it is possible to perform display with high visibility regardless of the ambient light intensity. However, when a color filter having a conventional structure shown in FIG. 3, in which a reflective area and a transmissive area are not specifically defined and color characteristics in one pixel are uniform, is used, it is difficult to obtain vivid transmissive display. Specifically, when the vividness (color purity) of transmitted light is improved, the color purity of reflected light is also increased, and brightness which trades off with the color purity is extremely decreased, resulting in insufficient visibility. The problem is caused by the fact that in transmissive display, light from the backlight passes through the color filter once, while, in reflective display, ambient light passes through the color filter twice, i.e., when ambient light enters and when ambient light is reflected. Additionally, in a transflective liquid crystal display device, since the light source in the transmissive display mode is a backlight and the light source in the reflective display mode is ambient light, besides the color purity, the color tone also changes. The reason for this is that ambient light, as represented by a D65 light source, has a continuous spectrum, while light from the backlight has peaks of the spectrum at specific.

In order to solve the problems described above, a so-called "thickness-adjustment method" is disclosed in Japanese Unexamined Patent Publication No. 2001-33778 in which a transparent resin layer is formed in the reflective area so that transmissive display and reflective display have the same density of color (color purity), and thus brightness in reflective display is improved. FIG. 4 is a sectional view which schematically shows a color filter for a transflective liquid crystal display device fabricated by a known thickness-adjustment method. A transparent resin layer 3 is formed in a reflective area 6, and the thickness of a color layer 5 in the reflective area 6 is smaller than the thickness of the color layer 5 in a transmissive area 7. In this method, with respect to the color purity and brightness, the difference between transmissive display and reflective display can be decreased. However, it is not possible to correct the difference in color tone due to the fact that the light source in transmissive display is the backlight and the light source in reflective display is ambient light.

As a method for fabricating the transmissive area and the reflective area so as to have desired characteristics with respect to display (color purity, brightness, and color tone), use of a color filter shown in FIG. 5 may be mentioned, in which appropriate color layers are used for the individual transmissive areas and/or the reflective areas. In such a method (six-color application method), since the color purity and brightness can be changed in any way in each area, desired transmissive display and reflective display can be achieved. However, in photolithography, which is currently predominantly used for color filter manufacturing, at least two coloring agents must be applied to form pixels of one color, and in order to form pixels of three colors, red, green, and blue, photolithography must be performed at least two times for the individual colors, i.e., at least six times in total, resulting in an increase in the number of fabrication steps.

That is, in the conventional methods, it is not possible to obtain desired display characteristics (color purity, brightness, and color tone) for transmissive display and reflective display while fabricating a color filter inexpensively without increasing the number of fabrication steps.

SUMMARY OF THE INVENTION

It is an object of the present invention to provide a color filter inexpensively without increasing the number of fabrication steps in which desired characteristics (color purity, brightness, and color tone) can be obtained for reflective display and transmissive display.

The present inventors have carried out thorough research to overcome the difficulties described above and have achieved the present invention.

In one aspect of the present invention, a color filter for a liquid crystal display device includes a transmissive area and a reflective area for each pixel of at least one color, the pixel of at least one color includes a plurality of laminated color layers, and the color layer portion in the transmissive area and the color layer portion in the reflective area have different thicknesses.

Preferably, the reflective area includes a transparent resin layer.

Preferably, the transparent resin layer is disposed between a substrate and the color layer portion.

In the color filter of the present invention, preferably, in the pixel including the transmissive area and the reflective area, the thickness of the uppermost color layer in the transmissive area is larger than the thickness of the uppermost color layer in the reflective area.

In the color filter of the present invention, preferably, the uppermost color layer in the pixel including the plurality of laminated color layers is made of a photo-polymerized photosensitive color resist.

In the color filter of the present invention, preferably, the number of the laminated color layers is two.

The lower color layer is preferably composed of a photosensitive color resist.

Preferably, the photosensitive color resist is a photosensitive acrylic color resist.

Alternatively, the lower color layer is preferably composed of a non-photosensitive color paste.

Preferably, the non-photosensitive color paste contains a polyimide resin.

In the color filter of the present invention, preferably, the transparent resin layer has a thickness of 5 $\mu$m or less.

In the color filter of the present invention, preferably, in the pixel including the plurality of laminated color layers, the uppermost color layer composed of a photo-polymerized photosensitive color resist and the color layers other than the uppermost color layer have different color characteristics.

Preferably, the color filter further includes an overcoat layer disposed on the pixels.

In another aspect of the present invention, a liquid crystal display device includes the color filter of the present invention.

In another aspect of the present invention, in a method for making a color filter for a liquid crystal display device, the color filter including a transmissive area and a reflective area for each pixel of at least one color, the method includes the steps of forming a transparent resin layer on a substrate in the reflective area for the pixel of at least one color, and laminating a plurality of color layers in the pixel of at least one color, using a photosensitive color resist for the uppermost color layer.

In the method for making the color filter of the present invention, preferably, the transparent resin layer formed in the reflective area has a thickness of 5 $\mu$m or less.

In the method for making the color filter of the present invention, preferably, the photosensitive color resist used for the uppermost color layer and a photosensitive color resist or a non-photosensitive color paste used for the color layers other than the uppermost color layer have different solid contents.

In the method for making the color filter of the present invention, preferably, the photosensitive color resist used for the uppermost color layer has a higher solid content than that of a photosensitive color resist or a non-photosensitive color paste used for the color layers other than the uppermost color layer.

In the method for making the color filter of the present invention, preferably, the method further includes a step of removing the color layer other than the uppermost color layer formed on the transparent resin layer in the reflective area under an over-etching condition.

DESCRIPTION OF THE PREFERRED EMBODIMENTS

Figure 1:
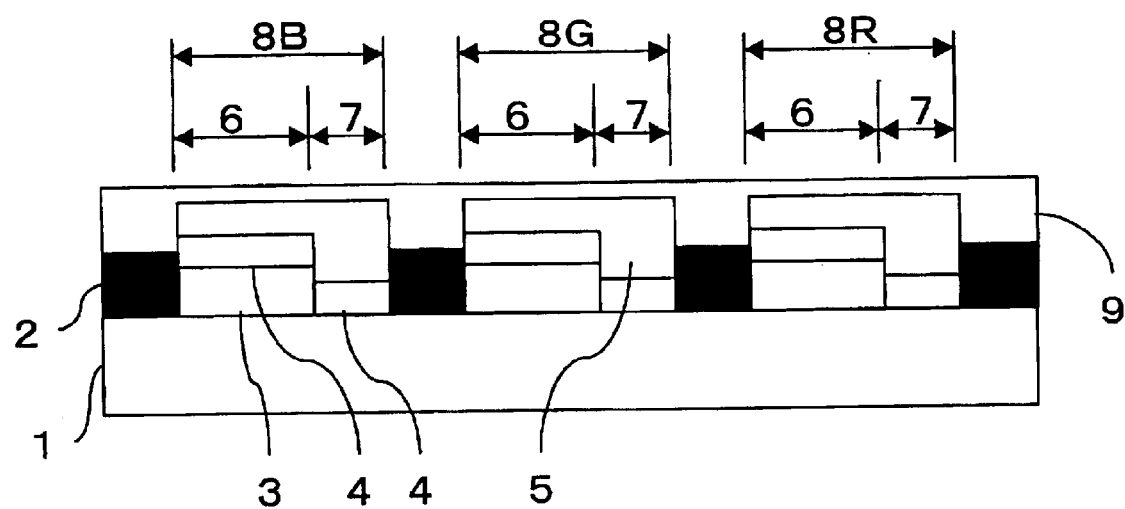
FIG. 1 is a sectional view showing a liquid crystal display device of the present invention.

A color filter of the present invention is suitable for use in a transflective liquid crystal display device provided with a transmissive area and a reflective area in a pixel, and it is possible to adjust transmissive display and reflective display so as to have desired color purities, brightnesses, and color tones.

In a transflective liquid crystal display device including a color filter of the present invention, a reflection layer may be formed on a substrate on the side of the color filter or a substrate facing the color filter. When the reflection layer is formed on the substrate on the side of the color filter, within a pixel region including a coloring agent layer, the region in which the reflection layer is formed corresponds to the reflective area, and the region not provided with the reflection layer corresponds to the transmissive area. When the reflection layer is formed on the substrate facing the color filter, the color filter pixel region corresponding to the reflection layer-forming area of the substrate constitutes the reflective area and the color filter pixel region corresponding to the region of the substrate not provided with the reflection layer constitutes the transmissive area.

In the color filter of the present invention, in order to adjust transmissive display and reflective display so as to have desired color purities, brightnesses, and color tones, it is important that (1) each pixel of at least one color has a laminated structure including a plurality of color layers, (2) the uppermost color layer is composed of a photosensitive color resist, and (3) a transparent resin layer is disposed between the substrate and the color layer in the reflective area.

By satisfying the requirements described above with respect to the pixels of at least one color, the effects of the present invention can be shown, i.e., a color filter having predetermined display characteristics in transmissive display and reflective display can be obtained with low costs. With respect to the pixels of the other colors, a so-called thickness adjustment method, a six-color application method, or any other method may be employed.

When the transparent resin layer is formed in the reflective area on the substrate, the reflective area protrudes by the thickness of the transparent layer, and the transmissive area is lower than the reflective area. That is, the substrate is partially protrudent. When a non-photosensitive color paste and/or a photosensitive color resist is applied onto the uneven substrate, the thickness of the color layer in the transmissive area is larger than the thickness of the color layer in the reflective area due to leveling by the color coating solution. In this way, by leveling by the coating solution, different thicknesses of the color layer can be set in the reflective area and the transmissive area, and it is possible to obtain desired color purities and brightnesses in transmissive display and reflective display. The degree of leveling by the color coating solution can be adjusted by the viscosity and the solid content of the coating solution. If the viscosity of the coating solution is low, leveling is easily performed, and if the solid content in the coating solution is high, leveling is easily performed.

Moreover, in the present invention, a plurality of color layers must be laminated. Preferably, the color layers to be laminated must have different color characteristics depending on the purposes. Herein, "different color characteristics" mean different color purities, brightnesses (transmittances), and color tones for the same light source (e.g., standard light source C). In order to obtain different color characteristics, the type of coloring agents, the composition of the coloring agents, the content of the coloring agents, etc., may be changed. Any number of color layers may be laminated. Although the number of color layers is selected appropriately in order to achieve the desired color characteristics, two-layer laminated structure is more preferable in view of productivity.

By laminating a plurality of color layers and by laminating the color layers having different color characteristics, it is possible to obtain desired color tones for transmissive display and reflective display. More preferably, by laminating the color layers so as to have different degrees of leveling, i.e., by using coating solutions having different solid contents for the color layers, the color tones for transmissive display and reflective display can be more effectively adjusted.

In the present invention, the uppermost color layer must be composed of a photosensitive color resist. If the uppermost color layer is composed of the photosensitive color resist, it is possible to perform patterning integrally with the lower color layer, and thus an increase in fabrication steps can be prevented.

When patterning is performed, only the lower color layer in the reflective area may be dissolved during development, and the reflective area may have only the uppermost photosensitive color resist layer as the color layer. By performing such a process, it is also possible to obtain desired characteristics for transmissive display and reflective display.

In the present invention, with respect to the pixel of at least one color, a color layer composed of a non-photosensitive color paste and/or a photosensitive color resist and a color layer composed of a photosensitive color resist are laminated. The color to be laminated is not particularly limited, and any one of the red pixel, green pixel, and blue pixel may be selected. The number of colors may be one, two, or three.

In order to take the difference in the light source into consideration, coloring for the pixels is preferably designed using any one of a standard light source C, a two-wavelength light source, and a three-wavelength light source as a backlight light source for the transmissive area, and using a D65 light source, which is close to sunlight (natural light) as ambient light, for the reflective area. Examples of two-wavelength light sources include a LED light source which emits white light by combining a blue LED with a yellow phosphor or yellow-green phosphor, and examples of three-wavelength light sources include a three-wavelength cold cathode fluorescent lamp, a white LED light source in which an ultraviolet LED is combined with red, blue, and green phosphors, a white LED light source in which red, blue, and green LEDs are combined, and an organic electroluminescence light source.

In the liquid crystal display device provided with the color filter of the present invention, any light source may be used as the backlight. More preferably, a three-wavelength light source, a three-wavelength LED light source in particular, is used because light can be efficiently used, thus enabling bright, vivid display. It is also possible to decrease the thickness of the color layer in the transmissive area having a high color purity, and the difference in the thickness of the color layer from the reflective area having a low color purity can be reduced, and thus processing can be easily performed.

The transparent resin layer used in the present invention is specifically a resin layer having an average transmittance of 80% or more in the visible light region. The thickness of the transparent resin layer formed in the reflective area is selected, taking the difference in the light source into account, so that desired color purities, brightnesses, and color tones are obtained for the reflective area and the transmissive area. As the thickness of the transparent resin layer is increased, the difference in the thickness of the color layer formed by leveling between the reflective area and the transmissive area is increased, thus greatly improving the brightness in the reflective area. If the thickness of the transparent resin layer is excessively large, firstly, the difference in height on the surface of the color filter is increased, and the liquid crystal alignment is adversely affected, resulting in a degradation in display quality. Secondly, it becomes difficult to control the thickness of the color layer in the reflective area, and the variation in reflective display characteristics is increased. Therefore, the thickness of the transparent resin layer is preferably 5 $\mu$m or less.

The transparent resin layer may be composed of a photosensitive resist. Examples of the photosensitive resist materials to be used include polyimide resins, epoxy resins, acrylic resins, urethane resins, polyester resins, and polyolefin resins. Preferably, an acrylic resin is used. As the photosensitive acrylic resin, in order to impart photosensitivity, a composition containing at least an acrylic polymer, an acrylic polyfunctional monomer or oligomer, and a photoinitiator is generally prepared. A so-called acrylic epoxy resin in which an epoxy monomer is added may be used. When the transparent resin layer is composed of a photosensitive resist, it is possible to control the roundness and flatness of the surface of the transparent resin layer by changing the distance between the exposure mask and the substrate on which the transparent resin layer is formed in the exposure step of the photolithographic process.

The transparent resin layer may be composed of a non-photosensitive paste. Examples of the non-photosensitive paste materials include polyimide resins, epoxy resins, acrylic resins, urethane resins, polyester resins, and polyolefin resins. Preferably, a polyimide resin is used. When the transparent resin layer is composed of a non-photosensitive paste, the transparent resin layer can be formed so as to have a flat upper surface and a transparent resin layer with a smaller area can be formed.

The transparent resin layer formed in the reflective area may contain particles for scattering light. If the transparent resin layer contains particles for scattering light, the glare in display due to the regular reflection component can be prevented, and satisfactory reflective display can be performed. In the transmissive area, since no transparent resin layer is present, light scattering does not occur and light from the backlight can be used effectively. Examples of the particles for scattering light to be used include inorganic oxide particles, such as silica, alumina, and titania, metal particles, and resin particles, such as acrylic resins, styrene resins, silicones, and fluorine-containing polymers. The acceptable particle size of the light-scattering particles is in the range of 0.1 to 10 μm. More preferably, the particle size of the light-scattering particles is smaller than the thickness of the transparent resin layer because the transparent resin layer becomes flat.

In a method for forming a transparent resin layer using a non-photosensitive paste, a non-photosensitive paste is applied onto a transparent substrate, and drying by heating (semicuring) is performed with a hot plate, an oven, a vacuum dryer, or the like. A positive photoresist is applied onto the semicured film, and drying by heating (prebaking) is performed. After prebaking, exposure is performed using a mask, development is performed using an alkaline developer, and then the photoresist is removed using a solvent to produce a transparent resin layer. Heat hardening is then performed.

In a method for forming a transparent resin layer using a photosensitive resist, a photosensitive resist is applied onto a transparent substrate, and drying by heating (prebaking) is performed with a hot plate, an oven, a vacuum dryer, or the like. After prebaking, exposure is performed using a mask, and development is performed using an alkaline developer, followed by heat hardening. A transparent resin layer is thereby obtained. If the thickness of the transparent resin layer is excessively large, it is difficult to form the transparent resin layer with a uniform thickness and shape over the entire transparent substrate. Therefore, the thickness of the transparent resin layer is preferably 5 μm or less.

Each of the color paste and the color resist used in the present invention contains a color component and a resin component. Preferred examples of the resin component include polyimide resins, epoxy resins, acrylic resins, urethane resins, polyester resins, and polyolefin resins.

The photosensitive color resist contains a color component and a resin component, and the resin component contains a photosensitive component which is made to react by light. There are two types of photosensitive color resist, i.e., a positive type and a negative type. In the positive photosensitive color resist, the photo-irradiated portions are dissolved into the developer, and in the negative photosensitive color resist, the photo-irradiated portions are sparingly soluble in the developer. Both types may be used in the present invention. Preferably, a negative photosensitive color resist is used because the transparency of the photosensitive component is high in the visible light range. Preferred examples of the resin component in the photosensitive color resist include polyimide resins, epoxy resins, acrylic resins, urethane resins, polyester resins, and polyolefin resins.

The color filter of the present invention includes color pixels of at least three colors, red, green, and blue. Coloring agents in general including organic pigments, inorganic pigments, and dyes may be used in the present invention. Representative examples of pigments include Pigment Red (PR-) 2, 3, 22, 38, 149, 166, 168, 177, 206, 207, 209, 224, 242, 254, Pigment Orange (PO-) 5, 13, 17, 31, 36, 38, 40, 42, 43, 51, 55, 59, 61, 64, 65, 71, Pigment Yellow (PY-) 12, 13, 14, 17, 20, 24, 83, 86, 93, 94, 109, 110, 117, 125, 137, 138, 139, 147, 148, 150, 153, 154, 166, 173, 185, Pigment Blue (PB-) 15 (15:1, 15:2, 15:3, 15:4, 15:6), 21, 22, 60, 64, Pigment Violet (PV-) 19, 23, 29, 32, 33, 36, 37, 38, 40, and 50. The pigments to be used are not limited to the above and various pigments may be used in the present invention.

A pigment which has been subjected to surface treatment, such as rosin treatment, acidifying treatment, basifying treatment, or pigment derivative treatment, may be used as required. Additionally, PR (Pigment Red), PY (Pigment Yellow), PV (Pigment Violet), PO (Pigment Orange), etc., are color index (C.I.; issued by The Society of Dyers and Colourists) symbols, and are formally prefixed by C.I. (e.g., C.I. PR254). They define standards for dyes and dyeing, and the respective symbols represent specific standard dyes and their colors. Hereinafter, in the description of the present invention, the notation of C.I. will be omitted (e.g., PR254 instead of C.I. PR254).

As the coloring agent for the red pixels of the color filter of the present invention, more preferably, PR242, PR254, a pigment including a quinacridone derivative, PO38, PY17, PY138, or PY150 is used. The quinacridone derivative in the present invention is a compound represented by the structural formula (1) below.

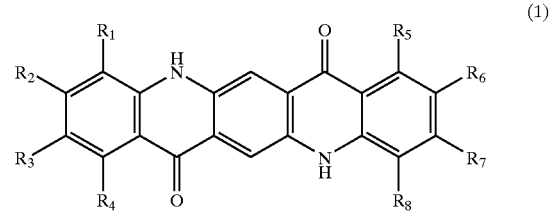

(1)

In the structural formula (1), each of $R_1$ to $R_8$ is independently a hydrogen atom, an alkyl group, such as a methyl group, or a halogen atom, such as a chlorine atom. Above all, PR122 (in the structural formula (1), $R_3$ and $R_6$ are methyl groups, and $R_1$, $R_2$, $R_4$, $R_5$, $R_7$, and $R_8$ are hydrogen atoms; refer to the structural formula (2) below), PV19 (in the structural formula (1), $R_1$ to $R_8$ are hydrogen atoms; refer to the structural formula (3) below), or PR209 (in the structural formula (1), $R_3$ and $R_6$ are chlorine atoms, and $R_1$, $R_2$, $R_4$, $R_5$, $R_7$, and $R_8$ are hydrogen atoms; refer to the structural formula (4) below) is particularly preferred.

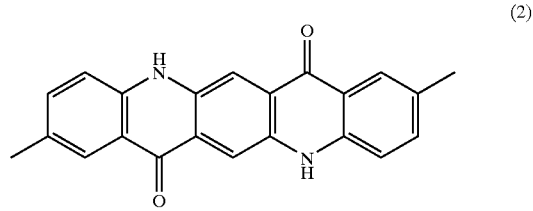

(2)

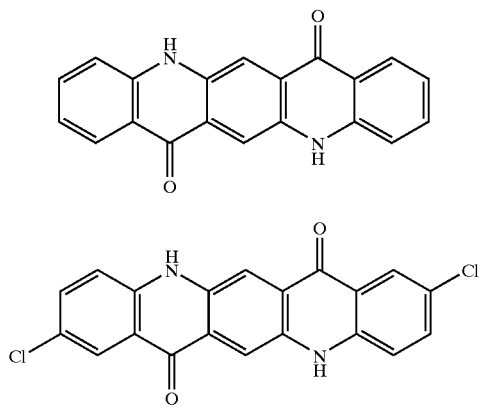

(3)

(4)

As the coloring agent for the green pixels of the color filter of the present invention, more preferably, PG7, PG36, PY17, PY138, or PY150 is used. As the coloring agent for the blue pixels, more preferably, PB15 (15:1, 15:2, 15:3, 15:4, 15:6), PB60, PV19, or PV23 is used.

As the method for applying a non-photosensitive color paste or photosensitive color resist, a dip method, a roll coating method, a spin coating method, a die coating method, a method in which die coating and spin coating are combined, a wire-bar coating method, or the like may be used.

In order to form a color layer, for example, a non-photosensitive color paste is applied on a transparent substrate in which a transparent resin layer is formed in the reflective areas of the pixels, and drying by heating (semicuring) is performed with a hot plate, an oven, or a vacuum dryer. A photosensitive color resist is applied onto the semicured film, and drying by heating (prebaking) is performed. After prebaking, exposure is performed using a mask, development is performed using an alkaline developer, and heat hardening is then performed. In such a photolithographic process, the non-photosensitive color paste layer and the photosensitive color resist layer can be simultaneously patterned, and pixels of one color can be formed by one photolithographic process even though the laminated structure is formed.

In the present invention, different thicknesses of the color layer are obtained by the formation of the transparent resin layer in the reflective area and by leveling of the color coating solution. However, any other method may be employed. For example, in the color layer composed of a photosensitive color resist, the thickness of the hardening layer may be changed by exposure energy during the exposure step using a mask in the photolithographic process. Although an example in which the resin component is an acrylic resin will be described, the photosensitive color resist of the present invention is not limited thereto. When the photosensitive color resist is subjected to photolithography, when the exposure energy is sufficient, photocrosslinking of the photosensitive color resist proceeds, and the exposed portions are not substantially dissolved into the developer. In the unexposed portions, since photocrosslinking of the acrylic resin does not proceed, dissolution into the developer occurs. On the other hand, when the exposure energy is insufficient for hardening of the photosensitive resin, since photocrosslinking of the acrylic resin does not proceed fully, even exposed portions are partially dissolved into the developer. Consequently, it is possible to adjust the thickness of the photosensitive resin by the exposure energy.

In order to adjust the exposure energy, a transflective photomask may be used, or a slit photomask or perforated photomask may be used. A transflective photomask has a transflective region with a transmittance greater than 0% and less than 100%. By using the transflective photomask, it is possible to adjust the thicknesses in the portion exposed with a high energy and in the portion exposed with a low energy. In a slit photomask, a slit with a width of 20 μm or less is formed in the shading region of the photomask, and exposure energy can be adjusted by averaging the amount of exposure energy passed through the slit per unit area. In a perforated photomask, at least one dot in the circular, elliptic, square, rectangular, rhombic, or trapezoidal shape or the like is formed in the shading region of the photomask, and exposure energy can be adjusted by averaging the amount of exposure energy passed through the dot per unit area.

Since the surface flatness may be impaired and a difference in height may be caused between the transmissive area and the reflective area by the formation of the transparent resin layer, an overcoat layer serving as a planarizing layer is preferably formed over the pixels. Specifically, an epoxy film, an acrylic epoxy film, an acrylic film, a siloxane polymer film, a polyimide film, a silicon-containing polyimide film, a polyimide siloxane film, or the like may be used.

The color filter is not necessarily formed on the transparent substrate composed of glass, a polymer film, or the like, and may be formed on the substrate provided with active elements. Examples of color filter patterns include striped patterns and island patterns, but are not limited thereto. Fixed type columnar spacers may be placed on the color filter as required.

The color filter of the present invention is built in a transflective liquid crystal display device. Herein, the transflective liquid crystal display device is a liquid crystal display device in which a reflection layer composed of an aluminum film, a silver film, or the like is provided in the reflective area of the counter substrate or color filter substrate, and such a reflection layer is not provided in the transmissive area. The color filter of the present invention is not restricted by the driving method or display mode of the liquid crystal display device, and is applicable to various types of liquid crystal display devices, such as active matrix type, passive matrix type, TN mode, STN mode, ECB mode, OCB mode, and VA mode devices. The color filter of the present invention can also be used without being restricted by the structure of the liquid crystal display device, for example, the number of polarizers, or the position of the scatterer.

An example of the method for fabricating a color filter of the present invention will be described below.

A non-photosensitive paste composed of polyamic acid and a solvent is applied to the entire surface of a transparent substrate, followed by drying by heating with a hot plate at 60 to 200° C. for 1 to 60 minutes. Next, a positive photoresist is applied to the polyamic acid film thus obtained, followed by drying by heating with a hot plate at 60 to 150° C. for 1 to 30 minutes. Ultraviolet irradiation is performed using an exposure device to bake a predetermined pattern, and development is performed using an alkaline developer to obtain a transparent resin layer in the predetermined pattern at a predetermined position. The transparent resin layer is heat hardened at 200 to 300° C.

Next, pixels are formed by depositing color layers. A non-photosensitive color paste composed of at least polyamic acid, a coloring agent, and a solvent is applied to the transparent substrate provided with the transparent resin layer, and a polyamic acid color film is then formed by drying in air, drying by heating, vacuum drying, or the like. In the case of drying by heating, using an oven, a hot plate, or the like, drying is preferably performed at 60 to 200° C. for 1 to 60 minutes. Next, a photosensitive color resist composed of a photosensitive acrylic resin containing an acrylic polymer, an acrylic polyfunctional monomer, and a photoinitiator; a coloring agent; and a solvent is applied to the polyamic acid color film, and a photosensitive acrylic color film is then formed by drying in air, drying by heating, vacuum drying, or the like. In the case of drying by heating, using an oven, a hot plate, or the like, drying is preferably performed at 60 to 200° C. for 1 minute to 3 hours. Next, ultraviolet irradiation is performed in a predetermined pattern on the photosensitive acrylic color film using a photomask and an exposure device. After exposure, the photosensitive acrylic color film and the polyamic acid color film are etched simultaneously using an alkaline developer.

The polyamic acid color film is transformed into a polyimide color film by heat hardening. The heat hardening is usually performed in air, in a nitrogen atmosphere, or in a vacuum, at 150 to 350° C., and preferably, at 180 to 250° C., for 0.5 to 5 hours, continuously or stepwise.

The process described above is performed for each of red, green, and blue pixels, and for a black matrix as required, and a color filter for a liquid crystal display device is thereby produced.

Next, an example of the liquid crystal display device fabricated using the color filter will be described. A transparent protective film is formed on the color filter, and a transparent electrode composed of an ITO film or the like is further formed thereon. Next, the color filter substrate and a transflective substrate provided with a transflective film formed by patterning a vapor-deposited metal film, a transparent insulating film formed on the transflective film, and a transparent electrode composed of an ITO film or the like are bonded together so as to face each other with alignment layers and spacers for retaining a cell gap therebetween, the alignment layers being provided on these substrates and having been subjected to rubbing treatment for aligning the liquid crystal. Additionally, besides the transflective film and the transparent electrode, projections for diffusing light, thin-film transistors (TFTs) or thin-film diodes (TFDs), scanning lines, and signal lines, etc., may also be placed on the transflective substrate to produce a TFT liquid crystal display device or a TFD liquid crystal display device. A liquid crystal is then injected into the cell gap from the filling port provided on the sealing section, and the filling port is sealed. Next, IC drivers, etc. are mounted thereon, and a module is thereby completed.

EXAMPLES

Measurement Method

Transmittance and chromaticity coordinates were measured with a Multi Channel Photo Detector "MCPD-2000" manufactured by Otsuka Electronics Co., Ltd., using as a reference, a glass substrate provided with an ITO film which had been formed on the same conditions as those for the ITO film formed on the color filter.

Herein, the transmissive area chromaticity is calculated based on the spectrum which is obtained by measuring the transmissive area of the color filter by a microspectrophotometer or the like. The reflective area chromaticity is calculated based on the spectrum obtained by squaring the transmittance of the colored section in the reflective area for each wavelength.

The thickness of the pixel was measured using a surface texture measuring instrument "SURFCOM 130A" manufactured by Tokyo Seimitsu Co., Ltd.

The present invention will be described in detail with reference to the examples below. In accordance with the present invention, desired color purities, brightnesses, and color tones can be obtained for reflective display and transmissive display.

In the examples and comparative examples below, the ratio of the reflector-forming area (reflective area) to the pixel aperture region is 50% unless otherwise stated. The areal ratio of the transparent resin layer to the reflective area is 100% unless otherwise stated.

Example 1

A. Formation of Polyamic Acid Solution 95.1 g of 4,4'-diaminodiphenylether and 6.2 g of bis(3-aminopropyl)tetramethyldisiloxane were prepared together with 525 g of γ-butyrolactone and 220 g of N-methyl-2-pyrrolidone, and 144.1 g of 3,3',4,4'-biphenyltetracarboxylic dianhydride was added thereto. After the reaction was allowed to proceed at 70° C. for 3 hours, 3.0 g of phthalic anhydride was added thereto, and the reaction was further allowed to proceed at 70° C. for 2 hours to obtain a 25% by weight polyamic acid solution (PAA).

B. Synthesis of Polymer Dispersant 161.3 g of 4,4'-diaminobenzanilide, 176.7 g of 3,3'-diaminodiphenylsulfone, and 18.6 g of bis(3-aminopropyl)tetramethyldisiloxane were prepared together with 2,667 g of γ-butyrolactone and 527 g of N-methyl-2-pyrrolidone, and 439.1 g of 3,3',4,4'-biphenyltetracarboxylic dianhydride was added thereto. After the reaction was allowed to proceed at 70° C. for 3 hours, 2.2 g of phthalic anhydride was added thereto, and the reaction was further allowed to proceed at 70° C. for 2 hours to obtain a polymer dispersant (PD) which was a 20% by weight polyamic acid solution.

C. Formation of Non-photosensitive Color Paste 3.6 g (80 wt %) of Pigment Red PR209, 0.9 g (20 wt %) of Pigment Orange PO38, 22.5 g of the polymer dispersant (PD), 42.8 g of γ-butyrolactone, and 20.2 g of 3-methoxy-3-methyl-1-butanol were prepared together with 90 g of glass beads. Dispersion was performed using a homogenizer at 7,000 rpm for 5 hours, and then the glass beads were removed by filtration. A 5% dispersion solution (RD) composed of PR209 and PO38 was thus obtained.

A red color paste (RPI-1) with a solid content of 8.3% was formed by adding a solution obtained by diluting 14.88 g of the polyamic acid solution (PAA) with 39.52 g of γ-butyrolactone to 45.6 g of the dispersion solution (RD). Similarly, a red color paste (RPI-2), green color pastes (GPI-1, GPI-2, GPI-3, and GPI-4), and blue color pastes (BPI-1, BPI-2, and BPI-3) with the composition ratios shown in Table 1 below were obtained. The solid content in each color paste was adjusted to 8.3%.

D. Formation of Non-photosensitive Transparent Paste

A non-photosensitive transparent paste (TPI-1) was obtained by diluting 16.0 g of the polyamic acid solution (PAA) with 34.0 g of γ-butyrolactone.

E. Formation of Photosensitive Color Resist 6.44 g of Pigment Red PR177, 1.61 g of Pigment Orange PO38, and 50 g of 3-methyl-3-methoxybutanol were prepared together with glass beads. Dispersion was performed using a homogenizer at 7,000 rpm for 5 hours, and then the glass beads were removed by filtration. A red resist (RAC-1) with a solid content of 17.2% was formed by mixing 70 g of an acrylic copolymer solution (43 wt % solution of CYCLOMER-P ACA250 manufactured by DAICEL Chemical Industries, Ltd.), 30 g of pentaerythritol tetramethacrylate as a polyfunctional monomer, and 100 g of a 20 wt % photosensitive acrylic resin solution, as a photoinitiator, obtained by adding 260 g of cyclopentanone to 15 g of "IRGACURE 369". Similarly, red resists (RAC-2, RAC-3, RAC-4, RAC-5, and RAC-6), green resists (GAC-1, GAC-2, GAC-3, GAC-4, GAC-5, and GAC-6), and blue resists (BAC-1, BAC-2, BAC-3, BAC-4, BAC-5, and BAC-6) with the composition ratios shown in Table 1 below were obtained. The solid content in each color resist was adjusted to 17.2%. With respect to a red resist (RAC-7), a green resist (GAC-7), and a blue resist (BAC-7), the solid content was adjusted to 8.3% by appropriately increasing the amount of cyclopentanone.

TABLE 1

| Paste No. | Pigment Composition (wt %) | Pigment/Resin (wt %) |
|---|---|---|
| RPI-1 | PR209/PO38 = 80/20 | 38/62 |
| RPI-2 | PR122/PR209 = 60/40 | 35/65 |
| GPI-1 | PY138 = 100 | 29/71 |
| GPI-2 | PG36/PY138 = 65/35 | 9/91 |
| GPI-3 | PG36/PY138 = 65/35 | 30/70 |
| GPI-4 | PG36/PY138 = 65/35 | 20/80 |
| BPI-1 | PB15:6/PV23 = 93/7 | 14/86 |
| BPI-2 | PB15:6/PV23 = 93/7 | 15/85 |
| BPI-3 | PB15:6/PV23 = 93/7 | 9/91 |
| RAC-1 | PR177/PO38 = 80/20 | 26/74 |
| RAC-2 | PR177 = 100 | 25/75 |
| RAC-3 | PR254/PY138 = 90/10 | 12/88 |
| RAC-4 | PR254 = 100 | 28/72 |
| RAC-5 | PR177/PY138 = 50/50 | 18/82 |
| RAC-6 | PR254/PR122 = 85/15 | 11/89 |
| GAC-1 | PG36/PY138 = 75/25 | 45/55 |
| GAC-2 | PG36/PY138 = 75/25 | 40/60 |
| GAC-3 | PG36/PY138 = 65/35 | 9/91 |
| GAC-4 | PG36/PY138 = 65/35 | 42/58 |
| GAC-5 | PG36/PY138 = 60/40 | 18/82 |
| GAC-6 | PG36/PY138 = 65/35 | 18/82 |
| BAC-1 | PB15:6/PV23 = 96/4 | 13/87 |
| BAC-2 | PB15:6 = 100 | 10/90 |
| BAC-3 | PB15:6 = 100 | 11/89 |
| BAC-4 | PB15:6 = 100 | 10/90 |
| BAC-5 | PB15:6 = 100 | 20/80 |
| BAC-6 | PB15:6/PV23 = 93/7 | 6/94 |

F. Formation of Color Film and Evaluation Thereof

The non-photosensitive paste (TPI-1) was applied by a spinner to a glass substrate on which a black matrix had been formed by patterning so that the thickness of the TPI-1 film was 1.5 μm after heat treatment. The coated film was dried by an oven at 120° C. for 20 minutes, and a positive photoresist (OFPR-800 manufactured by Tokyo Ohka Kogyo Co., Ltd.) was applied thereto, followed by drying by an oven at 90° C. for 10 minutes. Using an ultraviolet proximity exposure device PLA-501F manufactured by Canon Inc., the photoresist-applied substrate was exposed through a photomask at 60 mJ/cm$^2$ (intensity of ultraviolet light of 365 nm) so that the transparent resin layer remains in the reflective areas in the individual pixels of red, green, and blue. After the exposure, development of the photoresist and etching of the polyamic acid film were performed simultaneously by immersing the substrate in a developer composed of an aqueous solution of 2.0% tetramethylammonium hydroxide. After the etching, the unwanted photoresist layer was removed with acetone, and heat treatment was performed at 240° C. for 30 minutes. Transparent resin layers were thereby formed in the reflective areas of the red, green, and blue pixels.

Next, a red resist (RAC-1) was applied to the substrate by a spinner so that the thickness of the RAC-1 film was 2.1 μm at the center of the pixel in the transmissive area after heat treatment, followed by drying at 80° C. for 15 minutes. Using the ultraviolet exposure device, exposure was performed at 100 mJ/cm$^2$ (intensity of ultraviolet light of 365 nm) through a photomask composed of chromium which was designed so that light passed through the transmissive area and reflective area of the red pixel. After the exposure, the color layer composed of RAC-1 was developed by immersing the substrate in a developer composed of an aqueous solution of 0.1% tetramethylammonium hydroxide, and heat treatment was performed by an oven at 240° C. for 30 minutes.

Next, a green paste (GPI-1) was applied to the substrate by a spinner so that the thickness of the GPI-1 film was 0.7 μm at the center of the pixel in the transmissive area after heat treatment, followed by drying at 120° C. for 20 minutes. A green resist (GAC-1) was applied thereto by a spinner so that the total thickness of the GPI-1 film and the GAC-1 film was 2.2 μm after heat treatment, and the coated film was heat-treated by an oven at 80° C. for 10 minutes. Using the ultraviolet exposure device, exposure was performed at 100 mJ/cm$^2$ (intensity of ultraviolet light of 365 nm) through a photomask composed of chromium which was designed so that light passed through the transmissive area and reflective area of the green pixel. After the exposure, the laminated color layers composed of GAC-1 and GPI-1 were developed by immersing the substrate in a developer composed of an aqueous solution of 2.0% tetramethylammonium hydroxide, and heat treatment was performed by an oven at 240° C. for 30 minutes. Green pixels were thereby obtained.

A blue resist (BAC-1) was applied to the substrate by a spinner so that the thickness of the BAC-1 film was 2.1 μm at the center of the pixel in the transmissive area after heat treatment, and blue pixels were obtained by photolithography in the same manner as that for the red pixels.

An overcoat layer was formed at a thickness of 2.0 μm on the pixels, and an ITO film was formed further thereon by sputtering at a thickness of 0.14 μm. Table 2 below summarizes the structure of the color filter thus fabricated, the non-photosensitive color paste and the photosensitive color resists used, and the transparent resin layer.

TABLE 2

| | | Non-photosensitive Color Paste | Photosensitive Color Resist | Thickness of Transparent Resin Layer μm | Areal Ratio of Transparent Resin Layer to Reflective Area |
|---|---|---|---|---|---|
| Example 1 | R | not used | RAC-1 | 1.5 | 100% |
| | G | GPI-1 | GAC-1 | | |
| | B | not used | BAC-1 | | |
| Example 2 | R | RPI-1 | RAC-2 | 1.7 | 100% |
| | G | GPI-1 | GAC-2 | | |
| | B | BPI-1 | BAC-2 | | |
| Example 3 | R | RPI-1 | RAC-2 | 1.2 | 100% |
| | G | GPI-1 | GAC-2 | | |
| | B | BPI-1 | BAC-2 | | |
| Example 4 | R | RPI-1 | RAC-2 | 3.7 | 100% |
| | G | GPI-1 | GAC-2 | | |
| | B | BPI-1 | BAC-2 | | |
| Example 5 | R | RPI-1 | RAC-2 | 3.7 | 44% |
| | G | GPI-1 | GAC-2 | | 45% |
| | B | BPI-1 | BAC-2 | | 65% |
| Example 6 | R | RPI-2 | RAC-3 | 1.2 | 100% |
| | G | GPI-2 | GAC-3 | | |
| | B | not used | BAC-3 | | |
| Example 7 Cold cathode fluorescent lamp | R | RPI-1 | RAC-4 | 1.5 | 100% |
| | G | GPI-3 | GAC-4 | | |
| | B | BPI-2 | BAC-4 | | |
| Example 8 Three-wavelength LED | R | RPI-2 | RAC-5 | 1.2 | 100% |
| | G | GPI-4 | GAC-5 | | |
| | B | BPI-3 | BAC-5 | | |
| Example 9 | R | not used | RAC-2, 7 | 1.7 | 100% |
| | G | | GAC-2, 7 | | |
| | B | | BAC-2, 7 | | |
| Comparative Example 1 | R | not used | RAC-1 | not used | — |
| | G | | GAC-2 | | |
| | B | | BAC-1 | | |
| Comparative Example 2 | R | not used | RAC-1 | 1.5 | 100% |
| | G | | GAC-2 | | |
| | B | | BAC-1 | | |
| Comparative Example 3 | R | not used | RAC-1, 6 | 1.7 | 100% |
| | G | | GAC-2, 6 | | |
| | B | | BAC-1, 6 | | |

Figure 6:
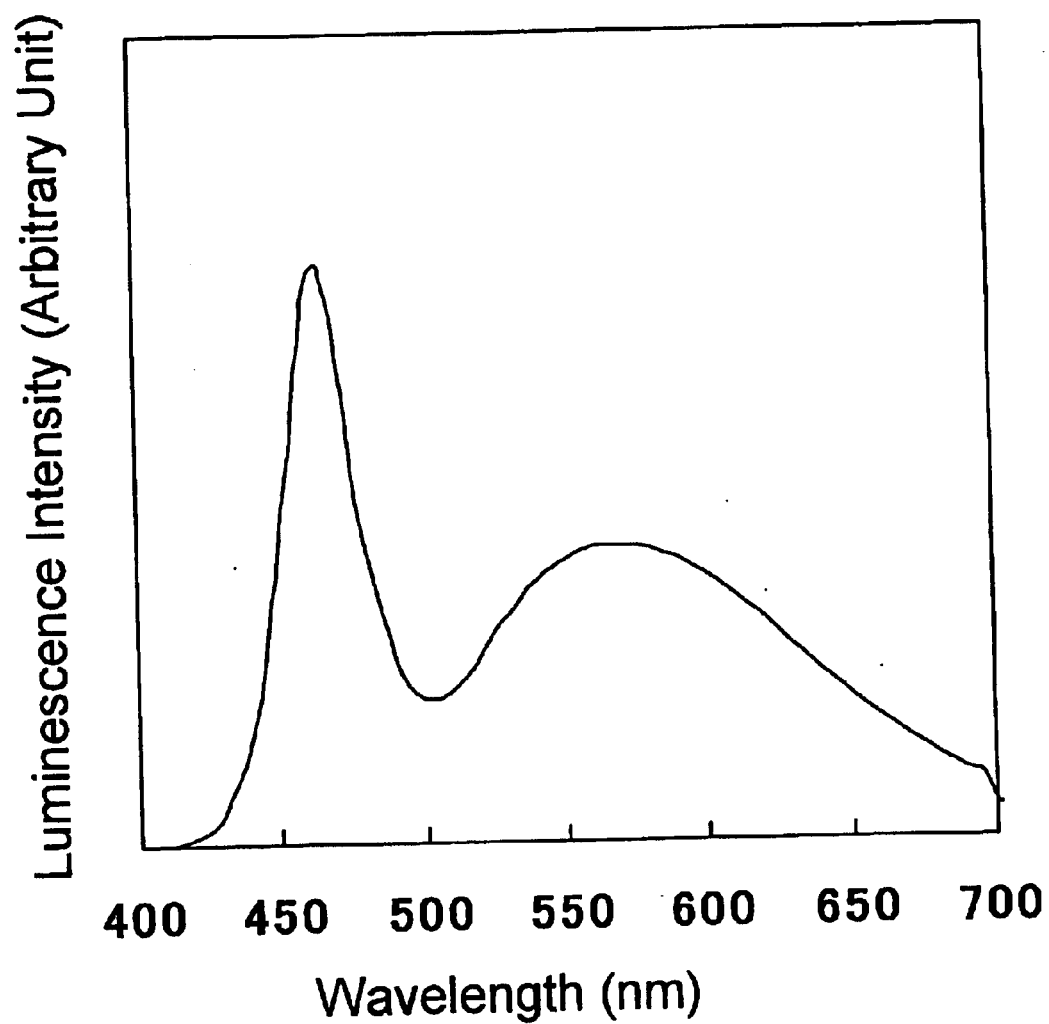
FIG. 6 is a graph showing a spectrum of a two-wavelength LED light source.

With respect to the color filter thus obtained, the reflective area chromaticity for a D65 light source and the transmissive area chromaticity for a two-wavelength LED light source are shown in Table 3. Additionally, the chromaticity coordinates of the two-wavelength LED light source were (0.327, 0.331). The spectrum of the two-wavelength LED light source is shown in FIG. 6.

TABLE 3

| | Transmissive area chromaticity (Two-wavelength LED light source) | | | Reflective area chromaticity (D65 light source) | | |
|---|---|---|---|---|---|---|
| | x | y | Y | x | y | Y |
| R | 0.598 | 0.312 | 18.0 | 0.596 | 0.299 | 17.8 |
| G | 0.315 | 0.587 | 48.5 | 0.306 | 0.589 | 55.0 |
| B | 0.146 | 0.156 | 19.2 | 0.145 | 0.174 | 22.6 |
| W | 0.298 | 0.325 | 28.6 | 0.293 | 0.338 | 31.8 |

Example 2

In this example, adjustments were made so that the difference between the transmissive area chromaticity and the reflective area chromaticity was decreased.

A transparent resin layer was obtained in the same manner as that in Example 1 except that the thickness of the transparent resin layer formed in the reflective area was 1.7 μm after heat treatment.

A red paste (RPI-1) was applied to the substrate by a spinner so that the thickness of the RPI-1 film was 0.7 μm at the center of the pixel in the transmissive area after heat treatment, followed by drying by an oven at 120° C. for 20 minutes. A red resist (RAC-2) was applied thereto by a spinner so that the total thickness of the RPI-1 film and the RAC-2 film was 2.4 μm after heat treatment, and the coated film was heat-treated by an oven at 80° C. for 10 minutes. Using the ultraviolet exposure device, exposure was performed at 100 mJ/cm$^2$ (intensity of ultraviolet light of 365 nm) through a photomask composed of chromium which was designed so that light passed through the transmissive area and reflective area of the red pixel. After the exposure, the laminated color layers composed of RAC-2 and RPI-1 were developed simultaneously by immersing the substrate in a developer composed of an aqueous solution of 2.0% tetramethylammonium hydroxide, and heat treatment was performed by an oven at 240° C. for 30 minutes. Red pixels were thereby obtained.

A green paste (GPI-1) was applied to the substrate by a spinner so that the thickness of the GPI-1 film was 0.7 μm at the center of the pixel in the transmissive area after heat treatment, followed by drying by an oven at 120° C. for 20 minutes. A green resist (GAC-2) was applied thereto by a spinner so that the total thickness of the GPI-1 film and the GAC-2 film was 2.4 μm after heat treatment, and the coated film was heat-treated by an oven at 80° C. for 10 minutes. The GPI-1 film and the GAC-2 film were simultaneously subjected to photolithography in the same manner as that for the red pixels. Green pixels were thereby obtained.

Next, a blue paste (BPI-1) was applied to the substrate by a spinner so that the thickness of the BPI-1 film was 0.7 $\mu$m at the center of the pixel in the transmissive area after heat treatment, followed by drying by an oven at 120° C. for 20 minutes. A blue resist (BAC-2) was applied thereto by a spinner so that the total thickness of the BPI-1 film and the BAC-2 film was 2.4 $\mu$m after heat treatment, and the coated film was heat-treated by an oven at 80° C. for 10 minutes. The BPI-1 film and the BAC-2 film were simultaneously subjected to photolithography in the same manner as that for the red pixels. Blue pixels were thereby obtained.

An overcoat layer was formed at a thickness of 2.0 $\mu$m on the pixels, and an ITO film was formed further thereon by sputtering at a thickness of 0.14 $\mu$m. Table 2 summarizes the structure of the color filter thus fabricated, the non-photosensitive color pastes and the photosensitive color resists used, and the transparent resin layer. FIG. 1 is a sectional view which schematically shows the color filter thus obtained. In FIG. 1, numeral 1 represents a transparent substrate, numeral 2 represents a black matrix, numeral 3 represents a transparent resin layer, numeral 4 represents a color layer composed of a non-photosensitive color paste, numeral 5 represents a color layer composed of a photosensitive color resist, numeral 6 represents a reflective area, numeral 7 represents a transmissive area, symbol 8B represents a blue pixel region, symbol 8G represents a green pixel region, symbol 8R represents a red pixel region, and numeral 9 represents an overcoat layer.

With respect to the color filter thus obtained, the reflective area chromaticity for a D65 light source and the transmissive area chromaticity for a two-wavelength LED light source are shown in Table 4 below. Additionally, the chromaticity coordinates of the two-wavelength LED light source were (0.327, 0.331).

TABLE 4

| | Transmissive area chromaticity (Standard light source C) | | | Reflective area chromaticity (Standard light source C) | | |
|---|---|---|---|---|---|---|
| | x | y | Y | x | y | Y |
| R | 0.592 | 0.294 | 17.1 | 0.595 | 0.308 | 18.8 |
| G | 0.280 | 0.593 | 50.1 | 0.309 | 0.582 | 54.4 |
| B | 0.145 | 0.165 | 22.3 | 0.140 | 0.145 | 17.8 |
| W | 0.279 | 0.322 | 29.8 | 0.297 | 0.328 | 30.3 |

| | Transmissive area chromaticity (Two-wavelength LED light source) | | | Reflective area chromaticity (D65 light source) | | |
|---|---|---|---|---|---|---|
| | x | y | Y | x | y | Y |
| R | 0.597 | 0.311 | 17.2 | 0.598 | 0.311 | 18.5 |
| G | 0.315 | 0.587 | 48.5 | 0.306 | 0.589 | 55.0 |
| B | 0.145 | 0.157 | 19.2 | 0.139 | 0.157 | 18.0 |
| W | 0.295 | 0.327 | 28.3 | 0.299 | 0.342 | 30.5 |

Table 4 also shows the transmissive area chromaticity and the reflective area chromaticity for the same light source (standard light source C). With respect the red pixel, a difference in y between the transmissive area chromaticity and the reflective area chromaticity is 0.014. With respect to the green pixel, a difference in x between the transmissive area chromaticity and the reflective area chromaticity is 0.029. With respect to the blue pixel, a difference in y between the transmissive area chromaticity and the reflective area chromaticity is 0.020. The differences in color purity and color tone are in the recognizable ranges. On the other hand, the difference between the transmissive area chromaticity for the two-wavelength LED light source and the reflective area chromaticity for the D65 light source is less than 0.009, from which the differences in color purity and color tone are not recognizable.

Examples in which the color purity and brightness of the reflective area chromaticity were adjusted will be described below.

Example 3

A color filter was fabricated in the same manner as that in Example 2 except that the thickness of the transparent resin layer formed in the reflective area was 1.2 $\mu$m after heat treatment.

An overcoat layer was formed at a thickness of 2.0 $\mu$m on the pixels, and an ITO film was formed further thereon by sputtering at a thickness of 0.14 $\mu$m. Table 2 summarizes the structure of the color filter thus fabricated, the non-photosensitive color pastes and the photosensitive color resists used, and the transparent resin layer.

With respect to the color filter thus obtained, the reflective area chromaticity for a D65 light source and the transmissive area chromaticity for a two-wavelength LED light source are shown in Table 5 below. Additionally, the chromaticity coordinates of the two-wavelength LED light source were (0.327, 0.331).

TABLE 5

| | Transmissive area chromaticity (Two-wavelength LED light source) | | | Reflective area chromaticity (D65 light source) | | |
|---|---|---|---|---|---|---|
| | x | y | Y | x | y | Y |
| R | 0.597 | 0.311 | 17.2 | 0.632 | 0.312 | 15.3 |
| G | 0.315 | 0.587 | 48.5 | 0.282 | 0.611 | 47.3 |
| B | 0.145 | 0.157 | 19.2 | 0.136 | 0.146 | 15.8 |
| W | 0.295 | 0.327 | 28.3 | 0.288 | 0.334 | 26.1 |

In Example 3, it was possible to enlarge the color gamut while maintaining an adequate balance between the color purity of the reflective area chromaticity and the color purity of the transmissive area chromaticity.

Example 4

A color filter was fabricated in the same manner as that in Example 2 except that the thickness of the transparent resin layer formed in the reflective area was 3.7 $\mu$m after heat treatment.

An overcoat layer was formed at a thickness of 2.0 $\mu$m on the pixels, and an ITO film was formed further thereon by sputtering at a thickness of 0.14 $\mu$m. Table 2 summarizes the structure of the color filter thus fabricated, the non-photosensitive color pastes and the photosensitive color resists used, and the transparent resin layer.

With respect to the color filter thus obtained, the reflective area chromaticity for a D65 light source and the transmissive area chromaticity for a two-wavelength LED light source are shown in Table 6 below. Additionally, the chromaticity coordinates of the two-wavelength LED light source were (0.327, 0.331).

TABLE 6

| | Transmissive area chromaticity (Two-wavelength LED light source) | | | Reflective area chromaticity (D65 light source) | | |
|---|---|---|---|---|---|---|
| | x | y | Y | x | y | Y |
| R | 0.597 | 0.311 | 17.2 | 0.550 | 0.317 | 24.9 |
| G | 0.315 | 0.587 | 48.5 | 0.343 | 0.555 | 66.0 |
| B | 0.145 | 0.157 | 19.2 | 0.145 | 0.171 | 21.0 |
| W | 0.295 | 0.327 | 28.3 | 0.318 | 0.349 | 37.3 |

In Example 4, it was possible to increase brightness in the reflective area while maintaining an adequate balance between the color purity of the reflective area chromaticity and the color purity of the transmissive area chromaticity.

Example 5

A color filter was fabricated in the same manner as that in Example 4 except that exposure was performed using photomasks which did not transmit light in 44% of the reflective area of the red pixel, in 45% of the reflective area of the green pixel, and in 65% of the reflective area of the blue pixel, respectively, and transparent layers were formed in 44% of the reflective area of the red pixel, in 45% of the reflective area of the green pixel, and in 65% of the reflective area of the blue pixel.

An overcoat layer was formed at a thickness of 2.0 μm on the pixels, and an ITO film was formed further thereon by sputtering at a thickness of 0.14 μm. Table 2 summarizes the structure of the color filter thus fabricated, the non-photosensitive color pastes and the photosensitive color resists used, and the transparent resin layer.

With respect to the color filter thus obtained, the reflective area chromaticity for a D65 light source and the transmissive area chromaticity for a two-wavelength LED light source are shown in Table 7 below. Additionally, the chromaticity coordinates of the two-wavelength LED light source were (0.327, 0.331).

TABLE 7

| | Transmissive area chromaticity (Two-wavelength LED light source) | | | Reflective area chromaticity (D65 light source) | | |
|---|---|---|---|---|---|---|
| | x | y | Y | x | y | Y |
| R | 0.597 | 0.311 | 17.2 | 0.597 | 0.315 | 17.2 |
| G | 0.315 | 0.587 | 48.5 | 0.309 | 0.587 | 47.6 |
| B | 0.145 | 0.157 | 19.2 | 0.142 | 0.157 | 17.7 |
| W | 0.295 | 0.327 | 28.3 | 0.296 | 0.332 | 27.5 |

In Example 5, it was also possible to adjust the color purities of the reflective area chromaticity and the transmissive area chromaticity by adjusting the areal ratios of the transparent resin layers to the reflective areas, in addition to the lamination of color layers.

Example 6

A transparent resin layer was formed in the same manner as that in Example 1 except that the thickness of the transparent resin layer formed in the reflective area was 1.2 μm after heat treatment.

A red paste (RPI-2) was applied to the substrate by a spinner so that the thickness of the RPI-2 film was 1.7 μm at the center of the pixel in the transmissive area after heat treatment, followed by drying by an oven at 120° C. for 20 minutes. A red resist (RAC-3) was applied thereto by a spinner so that the total thickness of the RPI-2 film and the RAC-3 film was 3.4 μm after heat treatment, and the coated film was heat-treated by an oven at 80° C. for 10 minutes. Using the ultraviolet exposure device, exposure was performed at 100 mJ/cm$^2$ (intensity of ultraviolet light of 365 nm) through a photomask composed of chromium which was designed so that light passed through the transmissive area and reflective area of the red pixel. After the exposure, the laminated color layers composed of RAC-3 and RPI-2 were simultaneously developed by immersing the substrate in a developer composed of an aqueous solution of 2.0% tetramethylammonium hydroxide. Development was performed under an over-etching condition so that the color layer composed of RPI-2 in the reflective area was removed. Heat treatment was performed by an oven at 240° C. for 30 minutes. Red pixels were thereby obtained.

A green paste (GPI-2) was applied to the substrate by a spinner so that the thickness of the GPI-2 film was 1.7 μm at the center of the pixel in the transmissive area after heat treatment, followed by drying by an oven at 120° C. for 20 minutes. A green resist (GAC-3) was applied thereto by a spinner so that the total thickness of the GPI-2 film and the GAC-3 film was 3.4 μm after heat treatment, and the coated film was heat-treated by an oven at 80° C. for 10 minutes. The GPI-2 film and the GAC-3 film were simultaneously subjected to photolithography in the same manner as that for the red pixels. Green pixels were thereby obtained. Development was performed under an over-etching condition so that the color layer composed of GPI-2 in the reflective area was removed.

Next, in order to adjust the thicknesses in the R, G, and B pixels, a non-photosensitive paste (TPI-1) was applied to the substrate by a spinner so that the thickness of the TPI-1 film was 1.7 μm at the center of the pixel in the transmissive area after heat treatment, followed by drying by an oven at 120° C. for 20 minutes. A blue resist (BAC-3) was applied thereto by a spinner so that the total thickness of the TPI-1 film and the BAC-3 film was 3.4 μm after heat treatment, and the coated film was heat-treated by an oven at 80° C. for 10 minutes. The TPI-1 film and the BAC-3 film were simultaneously subjected to photolithography in the same manner as that for the red pixels. Blue pixels were thereby obtained. Development was performed under an over-etching condition so that the resin layer composed of TPI-1 in the reflective area was removed.

Figure 2:
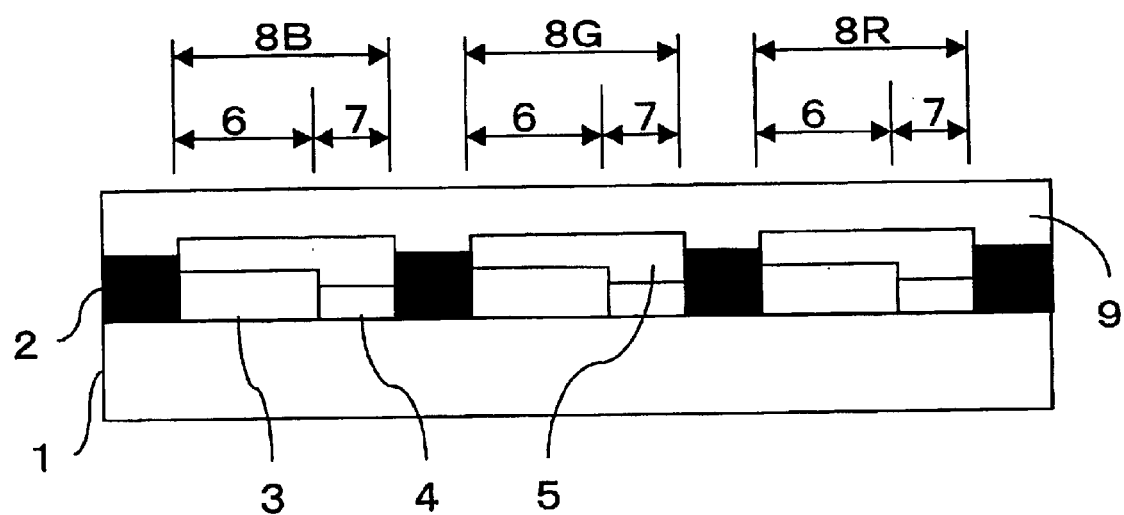
FIG. 2 is a sectional view showing a liquid crystal display device of the present invention.
Figure 3:
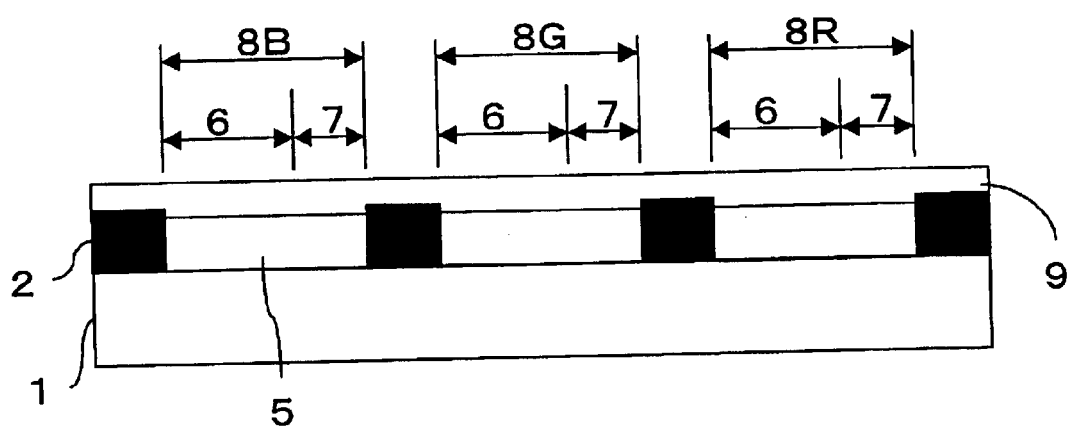
FIG. 3 is a sectional view showing a conventional liquid crystal display device.
Figure 4:
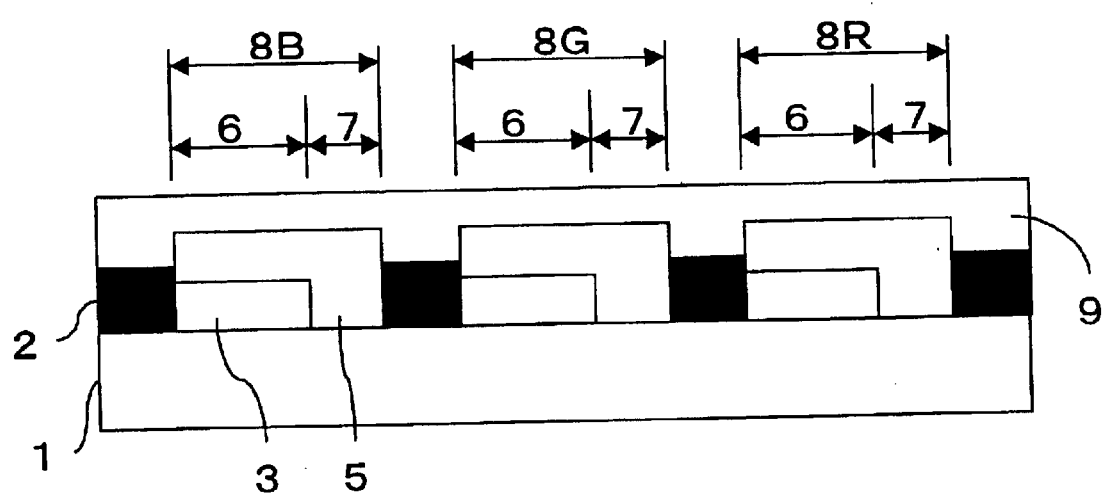
FIG. 4 is a sectional view showing a conventional liquid crystal device.
Figure 5:
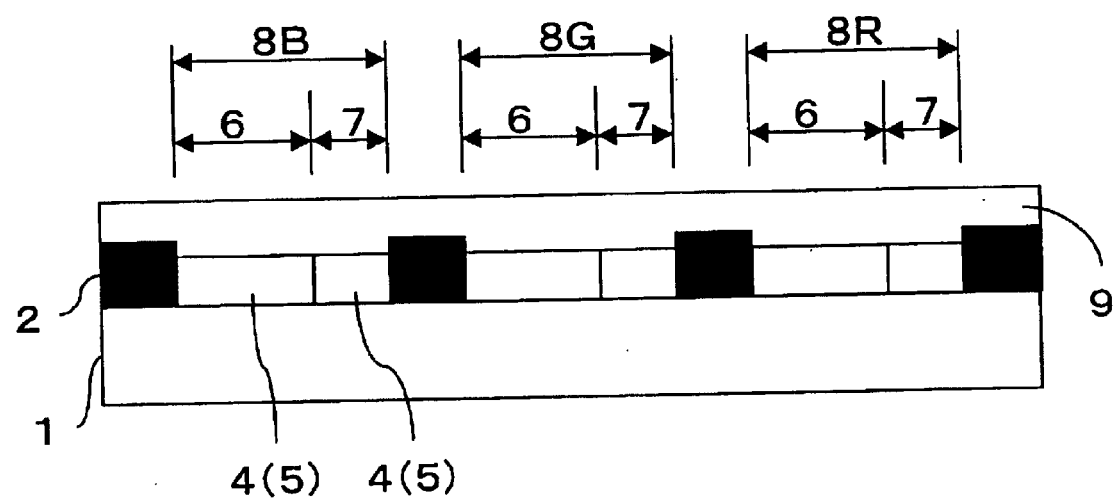
FIG. 5 is a sectional view showing a conventional liquid crystal device.

An overcoat layer was formed at a thickness of 2.0 μm on the pixels, and an ITO film was formed further thereon by sputtering at a thickness of 0.14 μm. Table 2 summarizes the structure of the color filter thus fabricated, the non-photosensitive color pastes and the photosensitive color resists used, and the transparent resin layer. FIG. 2 is a sectional view which schematically shows the resultant color filter.

With respect to the color filter thus obtained, the reflective area chromaticity for a D65 light source and the transmissive area chromaticity for a two-wavelength LED light source are shown in Table 8 below. Additionally, the chromaticity coordinates of the two-wavelength LED light source were (0.327, 0.331).

TABLE 8

| | Transmissive area chromaticity (Two-wavelength LED light source) | | | Reflective area chromaticity (D65 light source) | | |
|---|---|---|---|---|---|---|
| | x | y | Y | x | y | Y |
| R | 0.596 | 0.306 | 17.2 | 0.496 | 0.311 | 31.3 |
| G | 0.329 | 0.587 | 49.3 | 0.330 | 0.424 | 79.9 |
| B | 0.141 | 0.161 | 20.4 | 0.137 | 0.170 | 20.6 |
| W | 0.296 | 0.326 | 29.0 | 0.314 | 0.321 | 43.9 |

In Example 6, it was possible to increase the brightness in the reflective area by dissolving only the non-photosensitive polyimide layer in the reflective area during development.

Example 7

A transparent resin layer was formed in the same manner as that in Example 2 except that the thickness of the transparent resin layer formed in the reflective area was 1.5 μm after heat treatment.

A red paste (RPI-1) was applied to the substrate by a spinner so that the thickness of the RPI-1 film was 0.7 μm at the center of the pixel in the transmissive area after heat treatment, followed by drying by an oven at 120° C. for 20 minutes. Red pixels were obtained in the same manner as that in Example 2 except that a red resist (RAC-4) was applied thereto by a spinner so that the total thickness of the RPI-1 film and the RAC-4 film was 2.2 μm after heat treatment.

A green paste (GPI-3) was applied to the substrate by a spinner so that the thickness of the GPI-3 film was 0.7 μm at the center of the pixel in the transmissive area after heat treatment, followed by drying by an oven at 120° C. for 20 minutes. A green resist (GAC-4) was applied thereto by a spinner so that the total thickness of the GPI-3 film and the GAC-4 film was 2.2 μm after heat treatment. Green pixels were then obtained in the same manner as that in Example 2.

A blue paste (BPI-2) was applied to the substrate by a spinner so that the thickness of the BPI-2 film was 0.7 μm at the center of the pixel in the transmissive area after heat treatment, followed by drying by an oven at 120° C. for 20 minutes. A blue resist (BAC-4) was applied thereto by a spinner so that the total thickness of the BPI-2 film and the BAC-4 film was 2.2 μm after heat treatment. Blue pixels were then obtained in the same manner as that in Example 2.

An overcoat layer was formed at a thickness of 2.0 μm on the pixels, and an ITO film was formed further thereon by sputtering at a thickness of 0.14 μm. Table 2 summarizes the structure of the color filter thus fabricated, the non-photosensitive color pastes and the photosensitive color resists used, and the transparent resin layer.

Figure 7:
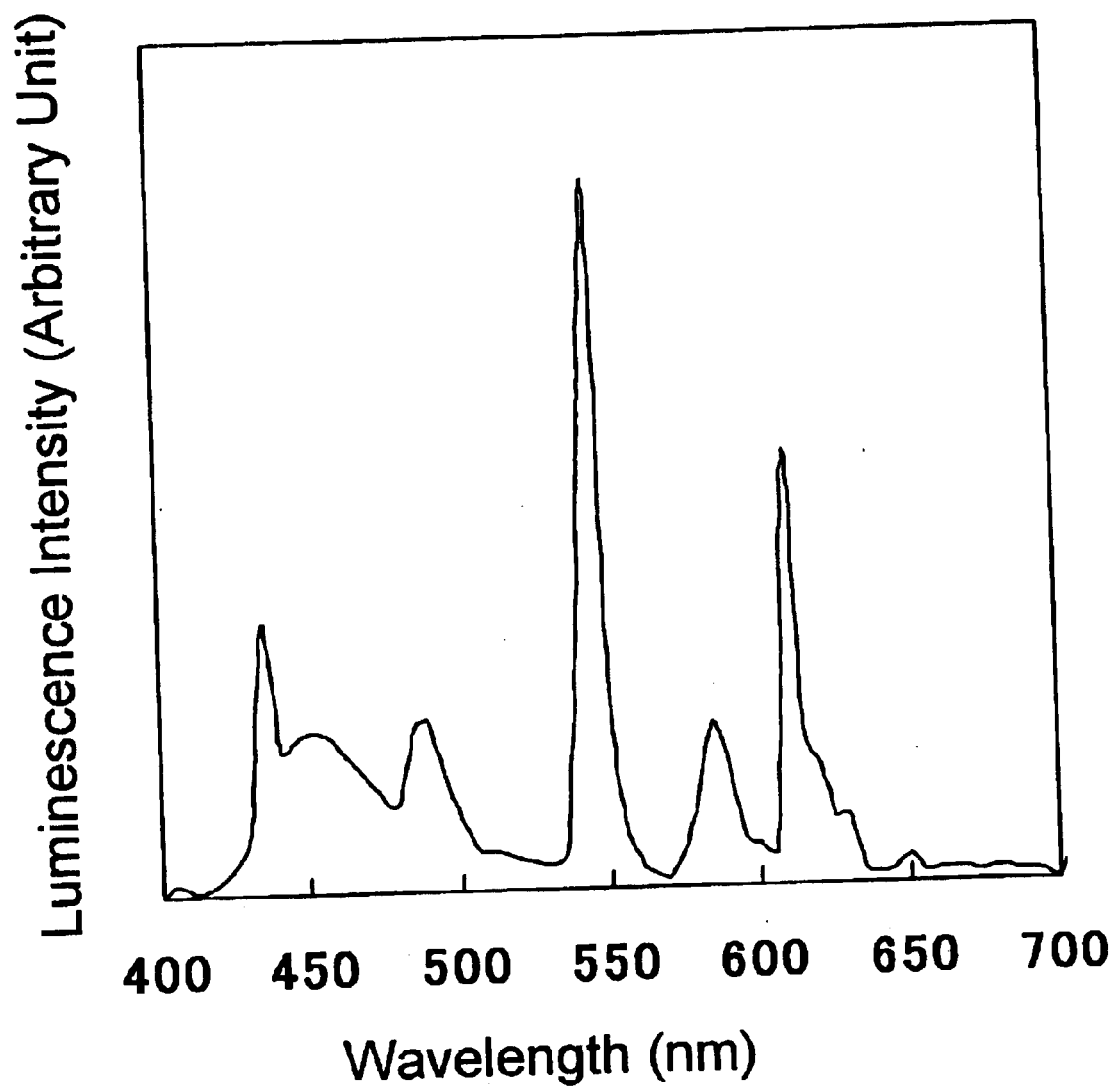
FIG. 7 is a graph showing a spectrum of a three-wavelength cold-cathode fluorescent lamp.

With respect to the color filter thus obtained, the reflective area chromaticity for a D65 light source and the transmissive area chromaticity for a three-wavelength cold cathode fluorescent lamp are shown in Table 9 below. Additionally, the chromaticity coordinates of the three-wavelength cold cathode fluorescent lamp were (0.311, 0.326). The spectrum of the three-wavelength cold cathode fluorescent lamp is shown in FIG. 7.

TABLE 9

| | Transmissive area chromaticity (Three-wavelength cold cathode fluorescent lamp) | | | Reflective area chromaticity (D65 light source) | | |
|---|---|---|---|---|---|---|
| | x | y | Y | x | y | Y |
| R | 0.595 | 0.328 | 23.7 | 0.594 | 0.326 | 24.1 |
| G | 0.289 | 0.587 | 56.9 | 0.286 | 0.584 | 52.6 |
| B | 0.155 | 0.153 | 19.5 | 0.138 | 0.152 | 17.0 |
| W | 0.306 | 0.337 | 33.4 | 0.309 | 0.340 | 31.2 |

In Example 7, it was possible to adjust the color purity balance of the reflective area chromaticity and the color purity balance of the transmissive area chromaticity even when the three-wavelength cold cathode fluorescent lamp was used.

Example 8

A transparent resin layer was obtained in the same manner as that in Example 1 except that the thickness of the transparent resin layer formed in the reflective area was 1.2 μm after heat treatment.

Red pixels were obtained in the same manner as that in Example 7 except that RPI-2 was used as the non-photosensitive red paste for the red pixels and RAC-5 was used as the photosensitive red resist.

Green pixels were obtained in the same manner as that in Example 7 except that GPI-4 was used as the non-photosensitive green paste for the green pixels and GAC-5 was used as the photosensitive green resist.

Blue pixels were obtained in the same manner as that in Example 7 except that BPI-3 was used as the non-photosensitive blue paste for the blue pixels and BAC-5 was used as the photosensitive blue resist.

An overcoat layer was formed at a thickness of 2.0 μm on the pixels, and an ITO film was formed further thereon by sputtering at a thickness of 0.14 μm. Table 2 summarizes the structure of the color filter thus fabricated, the non-photosensitive color pastes and the photosensitive color resists used, and the transparent resin layer.

Figure 8:
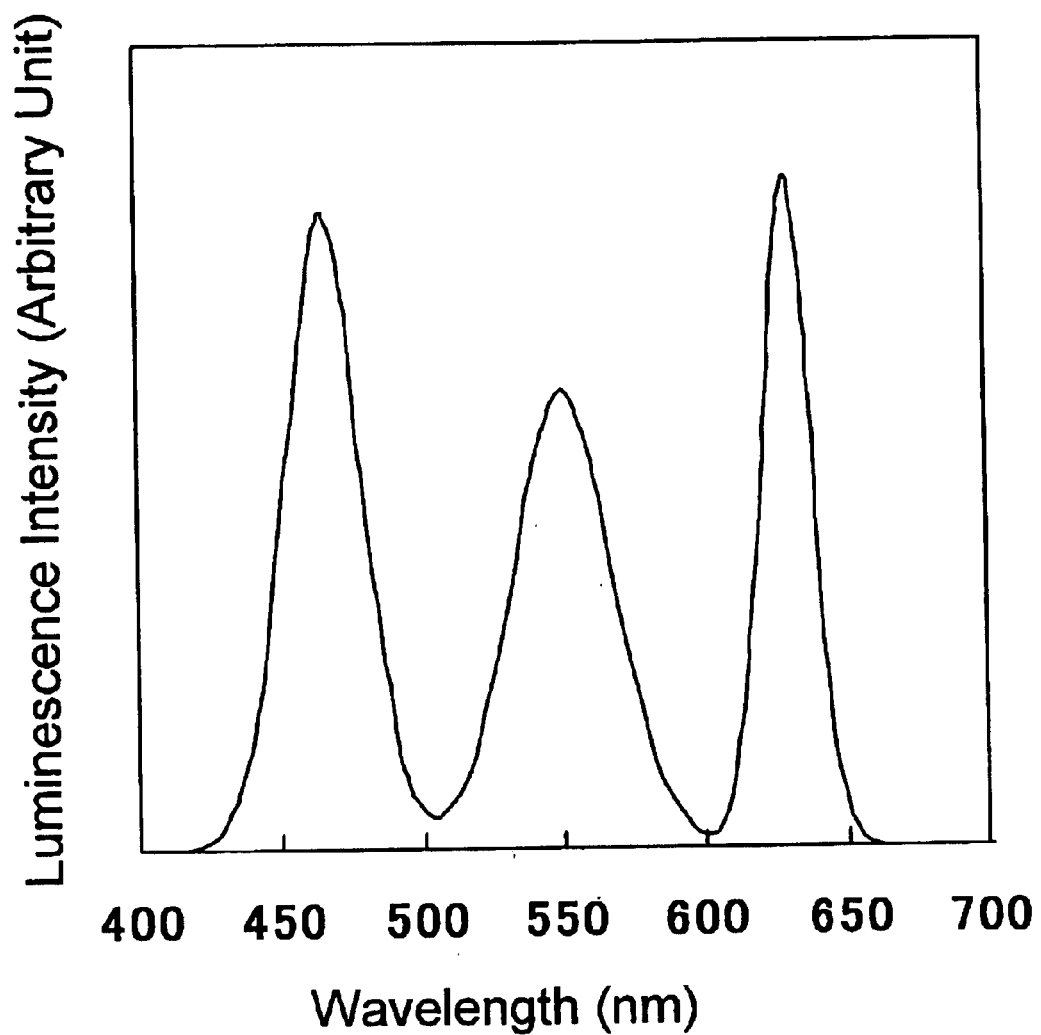
FIG. 8 is a graph showing a spectrum of a three-wavelength LED light source.

With respect to the color filter thus obtained, the reflective area chromaticity for a D65 light source and the transmissive area chromaticity for a three-wavelength LED light source are shown in Table 10 below. Additionally, the chromaticity coordinates of the three-wavelength LED light source were (0.303, 0.317). The spectrum of the three-wavelength LED light source is shown in FIG. 8.

TABLE 10

| | Transmissive area chromaticity (Three-wavelength LED light source) | | | Reflective area chromaticity (D65 light source) | | |
|---|---|---|---|---|---|---|
| | x | y | Y | x | y | Y |
| R | 0.585 | 0.304 | 20.0 | 0.588 | 0.310 | 19.2 |
| G | 0.310 | 0.585 | 63.3 | 0.304 | 0.587 | 56.1 |
| B | 0.156 | 0.157 | 23.6 | 0.140 | 0.158 | 19.1 |
| W | 0.295 | 0.329 | 35.6 | 0.296 | 0.340 | 31.5 |

In Example 8, it was possible to adjust the color purity balance of the reflective area chromaticity and the color purity balance of the transmissive area chromaticity even when the three-wavelength LED light source was used.

Example 9

In this example, photosensitive acrylic resists were applied to the transparent resin layer.

A transparent resin layer was obtained in the same manner as that in Example 1 except that the thickness of the transparent resin layer formed in the reflective area was 1.7 μm after heat treatment.

A red resist (RAC-7) was applied to the substrate by a spinner so that the thickness of the RAC-7 film was 0.7 μm at the center of the pixel in the transmissive area after heat treatment, followed by drying by an oven at 80° C. for 10 minutes. A red resist (RAC-2) was applied thereto by a spinner so that the total thickness of the RAC-7 film and the RAC-2 film was 2.4 μm after heat treatment, and the coated film was heat-treated by an oven at 80° C. for 10 minutes. Using the ultraviolet exposure device, exposure was performed at 100 mJ/cm$^2$ (intensity of ultraviolet light of 365 nm) through a photomask composed of chromium which was designed so that light passed through the transmissive area and reflective area of the red pixel. After the exposure, the laminated color layers composed of RAC-2 and RAC-7 were simultaneously developed by immersing the substrate in a developer composed of an aqueous solution of 2.0% tetramethylammonium hydroxide, and heat treatment was performed by an oven at 240° C. for 30 minutes. Red pixels were thereby obtained.

A green resist (GAC-7) was applied to the substrate by a spinner so that the thickness of the GAC-7 film was 0.7 μm at the center of the pixel in the transmissive area after heat treatment, followed by drying by an oven at 80° C. for 10 minutes. A green resist (GAC-2) was applied thereto by a spinner so that the total thickness of the GAC-7 film and the GAC-2 film was 2.4 μm after heat treatment, and the coated film was heat-treated by an oven at 80° C. for 10 minutes. The GAC-2 film and the GAC-7 film were simultaneously subjected to photolithography in the same manner as that for the red pixels. Green pixels were thereby obtained.

Next, a blue resist (BAC-7) was applied to the substrate by a spinner so that the thickness of the BAC-7 film was 0.7 μm at the center of the pixel in the transmissive area after heat treatment, followed by drying by an oven at 80° C. for 10 minutes. A blue resist (BAC-2) was applied thereto by a spinner so that the total thickness of the BAC-7 film and the BAC-2 film was 2.4 μm after heat treatment, and the coated film was heat-treated by an oven at 80° C. for 10 minutes. The BAC-7 film and the BAC-2 film were simultaneously subjected to photolithography in the same manner as that for the red pixels. Blue pixels were thereby obtained.

An overcoat layer was formed at a thickness of 2.0 μm on the pixels, and an ITO film was formed further thereon by sputtering at a thickness of 0.14 μm.

With respect to the color filter thus obtained, the reflective area chromaticity for a D65 light source and the transmissive area chromaticity for a two-wavelength LED light source are shown in Table 11 below. Additionally, the chromaticity coordinates of the two-wavelength LED light source were (0.327, 0.331).

TABLE 11

|   | Transmissive area chromaticity (Two-wavelength LED light source) | | | Reflective area chromaticity (D65 light source) | | |
|---|---|---|---|---|---|---|
|   | x | y | Y | x | y | Y |
| R | 0.597 | 0.311 | 17.2 | 0.598 | 0.311 | 18.5 |
| G | 0.315 | 0.587 | 48.5 | 0.306 | 0.589 | 55.0 |
| B | 0.145 | 0.157 | 19.2 | 0.139 | 0.157 | 18.0 |
| W | 0.295 | 0.327 | 28.3 | 0.299 | 0.342 | 30.5 |

In Example 9, it was possible to adjust the color purity balance of the reflective area chromaticity and the color purity balance of the transmissive area chromaticity even when photosensitive color resists were used instead of non-photosensitive polyimide pastes.

Comparative Example 1

A color filter was obtained in the same manner as that in Example 1 except that transparent resin layers were not formed in the reflective areas and green pixels were obtained by applying a green resist (GAC-2) to the substrate so that the thickness of the film was 2.1 μm at the center of the pixel in the transmissive area after heat treatment.

An overcoat layer was formed at a thickness of 2.0 μm on the pixels, and an ITO film was formed further thereon by sputtering at a thickness of 0.14 μm. Table 2 summarizes the structure of the color filter thus fabricated.

With respect to the color filter thus obtained, the reflective area chromaticity for a D65 light source and the transmissive area chromaticity for a two-wavelength LED light source are shown in Table 12 below. Additionally, the chromaticity coordinates of the two-wavelength LED light source were (0.327, 0.331).

TABLE 12

|   | Transmissive area chromaticity (Two-wavelength LED light source) | | | Reflective area chromaticity (D65 light source) | | |
|---|---|---|---|---|---|---|
|   | x | y | Y | x | y | Y |
| R | 0.598 | 0.312 | 18.0 | 0.678 | 0.312 | 12.4 |
| G | 0.296 | 0.584 | 46.5 | 0.223 | 0.652 | 31.7 |
| B | 0.146 | 0.156 | 19.2 | 0.134 | 0.118 | 11.4 |
| W | 0.291 | 0.321 | 27.9 | 0.274 | 0.300 | 18.5 |

A difference in x between the transmissive area chromaticity and the reflective area chromaticity was 0.080 in the red pixel, a difference in y was 0.068 in the green pixel, and a difference in y was 0.038 in the blue pixel. The brightness Y in the reflective area was low.

Comparative Example 2

A color filter was obtained in the same manner as that in Example 1 except that a transparent resin layer was formed at a thickness of 1.5 μm in the reflective area, a green resist (GAC-2) was applied to the substrate so that the thickness of the film was 2.1 μm at the center of the pixel in the transmissive area after heat treatment, and green pixels were formed in the same manner as that for the red pixels in Example 1.

An overcoat layer was formed at a thickness of 2.0 μm on the pixels, and an ITO film was formed further thereon by sputtering at a thickness of 0.14 μm. Table 2 summarizes the structure of the color filter thus fabricated.

With respect to the color filter thus obtained, the reflective area chromaticity for a D65 light source and the transmissive area chromaticity for a two-wavelength LED light source are shown in Table 13 below. Additionally, the chromaticity coordinates of the two-wavelength LED light source were (0.327, 0.331).

TABLE 13

|   | Transmissive area chromaticity (Two-wavelength LED light source) | | | Reflective area chromaticity (D65 light source) | | |
|---|---|---|---|---|---|---|
|   | x | y | Y | x | y | Y |
| R | 0.598 | 0.312 | 18.0 | 0.596 | 0.299 | 17.8 |
| G | 0.296 | 0.584 | 46.5 | 0.258 | 0.599 | 49.2 |
| B | 0.146 | 0.156 | 19.2 | 0.145 | 0.174 | 22.6 |
| W | 0.291 | 0.321 | 27.9 | 0.278 | 0.330 | 29.9 |

A difference in the chromaticity coordinate x between the transmissive area and the reflective area in the green pixel was 0.038.

Comparative Example 3

A red resist (RAC-1) was applied by a spinner to a glass substrate on which a black matrix had been formed by patterning so that the thickness of the RAC-1 film was 2.1 μm at the center of the pixel in the transmissive area after heat treatment. The coated film was dried at 80° C. for 15 minutes. Using the ultraviolet exposure device, exposure was performed at 100 mJ/cm$^2$ (intensity of ultraviolet light of 365 nm) through a photomask composed of chromium which was designed so that light passed through the transmissive area of the red pixel. After the exposure, the color layer composed of RAC-1 was developed by immersing the substrate in a developer composed of an aqueous solution of 0.1% tetramethylammonium hydroxide, and heat treatment was then performed by an oven at 240° C. for 30 minutes. Red pixels in the transmissive areas were thereby obtained.

Next, a red resist (RAC-6) was applied by a spinner to the substrate so that the thickness of the RAC-6 film was 2.1 μm at the center of the pixel in the reflective area after heat treatment. The coated film was dried at 80° C. for 15 minutes. Using the ultraviolet exposure device, exposure was performed at 100 mJ/cm$^2$ (intensity of ultraviolet light of 365 nm) through a photomask composed of chromium which was designed so that light passed through the reflective area of the red pixel. After the exposure, the color layer composed of RAC-6 was developed by immersing the substrate in a developer composed of an aqueous solution of 0.1% tetramethylammonium hydroxide, and heat treatment was then performed by an oven at 240° C. for 30 minutes. Red pixels in the reflective areas were thereby obtained.

Green pixels in the transmissive areas were obtained in the same manner as that for the red pixels in Comparative Example 1 except that a green resist (GAC-2) was applied to the substrate by a spinner so that the thickness of the GAC-2 film was 2.1 μm at the center of the pixel in the transmissive area after heat treatment. Green pixels in the reflective areas were obtained in the same manner as that for the red pixels in Comparative Example 1 except that a green resist (GAC-6) was applied to the substrate by a spinner so that the thickness of the GAC-6 film was 2.1 μm at the center of the pixel in the reflective area after heat treatment.

Blue pixels in the trasmissive areas were obtained in the same manner as that for the red pixels in Comparative Example 1 except that a blue resist (BAC-1) was applied to the substrate by a spinner so that the thickness of the BAC-1 film was 2.1 μm at the center of the pixel in the transmissive area after heat treatment. Blue pixels in the reflective areas were obtained in the same manner as that for the red pixels in Comparative Example 1 except that a blue resist (BAC-6) was applied to the substrate by a spinner so that the thickness of the BAC-6 film was 2.1 μm at the center of the pixel in the reflective area after heat treatment.

An overcoat layer was formed at a thickness of 2.0 μm on the pixels, and an ITO film was formed further thereon by sputtering at a thickness of 0.14 μm.

With respect to the color filter thus obtained, the reflective area chromaticity for a D65 light source and the transmissive area chromaticity for a two-wavelength LED light source are shown in Table 14 below. Additionally, the chromaticity coordinates of the two-wavelength LED light source were (0.327, 0.331).

TABLE 14

|   | Transmissive area chromaticity (Two-wavelength LED light source) | | | Reflective area chromaticity (D65 light source) | | |
|---|---|---|---|---|---|---|
|   | x | y | Y | x | y | Y |
| R | 0.598 | 0.312 | 18.0 | 0.597 | 0.311 | 20.6 |
| G | 0.296 | 0.584 | 46.5 | 0.297 | 0.584 | 56.3 |
| B | 0.146 | 0.156 | 19.2 | 0.142 | 0.156 | 17.9 |
| W | 0.291 | 0.321 | 27.9 | 0.304 | 0.342 | 31.6 |

In the color filter in this comparative example, although the differences in the chromaticity between the transmissive area and the reflective area for the red pixel, green pixel, and blue pixel were small at less than 0.005, since six photolithographic processes were required to fabricate the pixels of the color filter, fabrication costs were increased.

With respect to the color filters fabricated in Examples 1 and 2, the brightness Y in the reflective area is higher compared to the color filter fabricated in Comparative Example 1, and brighter reflective display is expected when the color filters are used for liquid crystal display devices.

In Comparative Example 2, a color filter was fabricated by a method in which a transparent resin layer is formed and color layers were not laminated. With respect to the red pixel, the difference in x between the transmissive area chromaticity and the reflective area chromaticity was 0.002, and thus the color purities are substantially the same. However, the difference in y between the transmissive area chromaticity and the reflective area chromaticity was 0.013, which was the level at which the difference in color tone was clearly visible. With respect to the green pixel, y of the reflective area chromaticity is higher than y of the transmissive area chromaticity by 0.015, thus showing a higher color purity. Furthermore, the difference in x between the transmissive area chromaticity and the reflective area chromaticity was 0.038, thus showing a large difference in color tone. With respect to the blue pixel, y of the reflective area chromaticity was higher than y of the transmissive area chromaticity by 0.018, thus showing a lower color purity. As is clear from the above, in Comparative Example 2 in which only the transparent resin layer was formed, the color purities were not balanced between the reflective area chromaticity and the transmissive area chromaticity, and the color tone in the reflective area was also greatly different from the color tone in the transmissive area. In contrast, with respect to the color filter fabricated in Example 1 in which the transparent layer was formed and the color layers were laminated in the blue pixel, a difference in y between the reflective area chromaticity and the transmissive area chromaticity was 0.001 with respect to the blue pixel, and the color purity balance was improved compared to Comparative Example 1. With respect to the color filter fabricated in Example 2 in which transparent resin layers were formed and color layers were laminated in all of the red, green, and blue pixels, the color purity and the color tone were satisfactorily balanced.

In Comparative Example 3, although the color purity and the color tone were satisfactorily balanced similarly to Example 2, six photolithographic processes must be performed in order to form the pixels of the color filter, resulting in an increased in costs.

(Fabrication of Liquid Crystal Display Device)

The color filter substrate and a transflective substrate provided with a transflective film formed by patterning a vapor-deposited metal film or the like, a transparent insulating film formed on the transflective film, and a transparent electrode composed of an ITO film or the like are bonded together so as to face each other with alignment layers and spacers for retaining a cell gap therebetween, the alignment layers being provided on these substrates and having been subjected to rubbing treatment for aligning the liquid crystal. Additionally, besides the transflective film and the transparent electrode, projections for diffusing light, thin-film transistors (TFTs) or thin-film diodes (TFDs), scanning lines, and signal lines, etc., may also be placed on the transflective substrate. A liquid crystal is then injected into the cell gap from the filling port provided on the sealing section, and the filling port is sealed. Next, IC drivers, etc. are mounted thereon, and a liquid crystal display device is thereby completed.

With respect to the transflective liquid crystal display devices using the color filters fabricated in Examples and Comparative Examples, the characteristics of reflective display were compared with the characteristics of transmissive display. Reflective display was evaluated under sunlight in the daytime, and transmissive display was evaluated using a backlight light source in a darkroom. As the backlight light source, a two-wavelength LED light source with chromaticity coordinates of (0.327, 0.331) for each of the liquid crystal display devices using the color filters fabricated in Examples 1 to 6 and Comparative Examples. A three-wavelength cold cathode fluorescent lamp with color coordinates of (0.311, 0.326) and a three-wave length LED light source with color coordinates of (0.303, 0.317) were used for the liquid crystal display devices using the color filters fabricated in Example 7 and Example 8, respectively.

With respect to the liquid crystal display devices using the color filters in Examples 1, 2, 5, 7, and 8, there was substantially no difference in color purity, brightness, and color tone between reflective display and transmissive display, showing satisfactory display characteristics. In contrast, with respect to the liquid crystal display device fabricated by the conventional technique in Comparative Example 1, there were differences in color tone for red, green, and blue between transmissive display and reflective display, and reflective display was dark. With respect to the liquid crystal display device using the color filter in Comparative Example 2, there was a difference in color tone for green in transmissive display.

With respect to the liquid crystal display device using the color filter in Example 3, although reflective display was slightly dark, reflective display was more vivid than transmissive display. With respect to the liquid crystal display devices using the color filters in Examples 4 and 6, although reflective display looked lighter than transmissive display, reflective display showed a bright characteristic.

With respect to the liquid crystal display device using the color filter in Comparative Example 3, there was substantially no difference in color purity, brightness, and color tone between reflective display and transmissive display, showing satisfactory display characteristics, similarly to the liquid crystal display device using the color filter in Example 2. However, six photolithographic processes must be performed in order to form the pixels of the color filter, and the fabrication costs were higher than those of the color filter fabricated by four photolithographic processes in Example 2.

As described above, in accordance with the present invention, it is possible to fabricate a color filter for a transflective liquid crystal display device inexpensively in which desired color purities, brightnesses, and color tones are obtained for reflective display and transmissive display.

What is claimed is:

1. A color filter for a liquid crystal display device comprising a transmissive area and a reflective area for each pixel of at least one color, the pixel of at least one color comprising a plurality of laminated color layers in at least one of the transmissive area and the reflective area, the color layer portion in the transmissive area and the color layer portion in the reflective area having different thicknesses, the reflective area including a transparent resin layer disposed between a substrate and the color layer portion.

2. A color filter according to claim 1, wherein in the pixel comprising the transmissive area and the reflective area, the thickness of the uppermost color layer in the transmissive area is larger than the thickness of the uppermost color layer in the reflective area.

3. A color filter according to claim 1, wherein the uppermost color layer in the pixel comprising the plurality of laminated color layers is made of a photo-polymerized photosensitive color resist.

4. A color filter according to claim 1, wherein the number of the laminated color layers is two.

5. A color filter according to claim 4, wherein the lower color layer comprises a photosensitive color resist.

6. A color filter according to claim 5, wherein the photosensitive color resist is a photosensitive acrylic color resist.

7. A color filter for a liquid crystal display device according to claim 1, wherein the transparent resin layer has a thickness of 5 $\mu$m or less.

8. A color filter according to claim 1, further comprising an overcoat layer disposed on the pixels.

9. A liquid crystal display device comprising a color filter according to claim 1.

10. A color filter for a liquid crystal display device comprising a transmissive area and a reflective area for each pixel of at least one color, the pixel of at least one color comprising two laminated color layers, wherein a lower color layer of the two color layers comprises a non-photosensitive color paste, the reflective area including resin layer disposed between a substrate and the color layer portion.

11. A color filter according to claim 10, wherein the non-photosensitive color paste contains a polyimide resin.

12. A color filter for a liquid crystal display device comprising a transmissive area and a reflective area for each pixel of at least one color, the pixel of at least one color comprising a plurality of laminated color layers, wherein in the pixel comprising the plurality of laminated color layers, the uppermost color layer comprising a photo-polymerized photosensitive color resist and the color layers other than the uppermost color layer have different color characteristics, and wherein the color layer portion in the transmissive area and the color layer portion in the reflective area have different thicknesses, the reflective area including a transparent resin layer disposed between a substrate and the color layer portion.

13. A method for making a color filter for a liquid crystal display device, the color filter comprising a transmissive area and a reflective area for each pixel of at least one color, the method comprising the steps of:

forming a transparent resin layer on a substrate in the reflective area for the pixel of at least one color; and laminating a plurality of color layers in the pixel of at least one color, using a photosensitive color resist for the uppermost color layer.

14. A method for making a color filter according to claim 13, wherein the transparent resin layer formed in the reflective area has a thickness of 5 $\mu$m or less.

15. A method for making a color filter for a liquid crystal display device, the color filter comprising a transmissive area and a reflective area for each pixel of at least one color, the method comprising the steps of:

forming a transparent resin layer on a substrate in the reflective area for the pixel of at least one color; and laminating a plurality of color layers having different color characteristics in the pixel of at least one color, using a photosensitive color resist for the uppermost color layer, wherein the photosensitive color resist used for the uppermost color layer and a photosensitive color resist or a non-photosensitive color paste used for the color layers other than the uppermost color layer have different solid contents.

16. A method for making a color filter for a liquid crystal display device, the color filter comprising a transmissive area and a reflective area for each pixel of at least one color, the method comprising the steps of:

forming a transparent resin layer on a substrate in the reflective area for the pixel of at least one color; and laminating a plurality of color layers having different color characteristics in the pixel of at least one color, using a photosensitive color resist for the uppermost color layer, wherein the photosensitive color resist used for the uppermost color layer has a higher solid content than that of a photosensitive color resist or a non-photosensitive color paste used for the color layers other than the uppermost color layer.

17. A method for making a color filter for a liquid crystal display device, the color filter comprising a transmissive area and a reflective area for each pixel of at least one color, the method comprising the steps of:

forming a transparent resin layer on a substrate in the reflective area for the pixel of at least one color;

laminating a plurality of color layers having different color characteristics in the pixel of at least one color, using a photosensitive color resist for the uppermost color layer; and removing the color layer other than the uppermost color layer formed on the transparent resin layer in the reflective area under an over-etching condition.

* * * * *

UNITED STATES PATENT AND TRADEMARK OFFICE
CERTIFICATE OF CORRECTION

PATENT NO. : 6,893,781 B2
DATED : May 17, 2005
INVENTOR(S) : Nonaka et al.

It is certified that error appears in the above-identified patent and that said Letters Patent is hereby corrected as shown below:

<u>Column 28,</u>
Line 60, after "paste," insert -- and wherein the color layer portion in the transmissive area and the color layer portion in the reflective area have different thicknesses --.

Signed and Sealed this

Twenty-fourth Day of January, 2006

JON W. DUDAS
*Director of the United States Patent and Trademark Office*